United States Patent [19]

Pandolfe

[11] 4,352,573
[45] Oct. 5, 1982

[54] HOMOGENIZING METHOD

[75] Inventor: William D. Pandolfe, Billerica, Mass.

[73] Assignee: Gaulin Corporation, Everett, Mass.

[21] Appl. No.: 116,601

[22] Filed: Jan. 29, 1980

[51] Int. Cl.³ .............................................. B01F 5/06
[52] U.S. Cl. ..................................... 366/176; 137/1; 137/15; 251/121; 366/138; 366/336; 366/337; 366/340
[58] Field of Search ................ 366/138, 176, 336–340; 137/1, 15, 625.3, 625.33; 251/121; 138/46

[56] References Cited

U.S. PATENT DOCUMENTS

| | | |
|---|---|---|
| 366,169 | 7/1887 | Hyatt . |
| 973,328 | 10/1910 | Willmann ............................ 138/46 |
| 996,704 | 7/1911 | Cribbins . |
| 1,070,218 | 8/1913 | Willmann ............................ 138/46 |
| 1,070,226 | 8/1913 | Becker ................................ 138/46 |
| 1,112,594 | 10/1914 | Brawner, Jr. . |
| 1,436,947 | 11/1922 | Davis . |
| 1,533,843 | 4/1925 | Ferns ................................. 366/225 |
| 2,882,025 | 4/1959 | Loo .................................... 366/340 |
| 3,179,385 | 4/1965 | Deackoff . |
| 3,526,391 | 9/1970 | Church, Jr. ........................ 366/340 |
| 3,732,851 | 5/1973 | Self . |
| 4,081,863 | 3/1978 | Rees ................................... 366/340 |
| 4,160,002 | 7/1979 | Janovtchik .......................... 99/453 |
| 4,205,696 | 6/1980 | Gongwer ............................. 137/1 |

FOREIGN PATENT DOCUMENTS

18059 of 1910 United Kingdom .

OTHER PUBLICATIONS

Gaulin Corp. Brochure No. Ind. 302.75, "Gaulin Ind. Homogenizers, Pumps and Colloid Mills", 5/79.
Kurzhals, "Investigations on the Physical and Technical Processes During High-Press. Homogenization of Milk".
Loo, C. C. and M. Carleton, "Further Studies of Cavitation in the Homogenization of Milk Products", 1953.
Loo, C. C., "Efficiency of A Milk Homogenizer Valve".
Gaulin Corporation Brochure (No. GFD 302.79) "Gaulin Homogenizers and Pumps for Food and Dairy Industries".

Primary Examiner—Philip R. Coe
Assistant Examiner—Timothy F. Simone
Attorney, Agent, or Firm—Hamilton, Brook, Smith and Reynolds

[57] ABSTRACT

It has been determined that homogenizing efficiency can be increased substantially by expressing the fluid through a valve in which the valve seat has a knife edge configuration and the valve gap has an optimum height of less than 0.003 inch. To provide the high flow rate required in most industrial applications, the total length of slits within a valve assembly, each having the optimum gap, is selected for given homogenizing and back pressures. In a preferred embodiment, in order to provide the extended slit length necessary within such a valve assembly, a plurality of annular valve slits are provided between stacked valve members within the assembly.

2 Claims, 17 Drawing Figures

HOMOGENIZING METHOD

DESCRIPTION

1. Technical Field

This invention relates to homogenizing apparatus and methods and in particular to such apparatus in which the material to be homogenized is forced under high pressure through a valve slit.

2. Background Art

Homogenization is the breaking down and mixing of the components of an emulsion or dispersion. A major use of homogenizers is to break down and disperse milk fat into the bulk of skim milk. This delays creaming of milk fat globules. Homogenizers are also used to process other emulsions such as silicone oil and to process dispersions such as pigments, antacids, and various paper coatings.

In the most widely used type of homogenizer, the emulsion is introduced at high pressure of from 500 psi to 10,000 psi to a central bore within an annular valve seat. The emulsion is forced out through a narrow gap between the valve seat and a valve plate. Through the gap, the emulsion undergoes extremely rapid acceleration as well as an extreme drop in pressure. This violent action through the valve breaks down globules within the emulsion to produce the homogenized product.

The degree of homogenization is a function of the difference between the pressure of the emulsion at the inlet to the valve and the pressure at the outlet. Past systems for homogenizing milk have, for example, used an inlet pressure in the order of 2,000 psi. Recently, in an effort to conserve the amount of energy required to homogenize milk and other products to a predetermined degree, attempts have been made to reduce that required homogenizing pressure. Such attempts have not resulted in the same degree of homogenization possible with higher pressures. An object of the present invention is to provide a method and apparatus for homogenizing to a desired degree but at lower pressures than has heretofore been possible. By homogenizing at lower pressures, less energy input is required at the liquid pump.

The exact mechanism by which homogenization occurs is not absolutely known; however, current theories and experimental evidence indicate that cavitation and turbulence are the primary forces responsible for the homogenization phenomenon. Based on those theories, Hans-Albert Kurzhals has concluded that a knife edge valve seat provides optimal valve geometry. Kurzhals used a knife edge valve in which the travel distance through which the fluid accelerated was about 0.004 inches. His experimental work was limited to the low flow rates of a laboratory environment, however.

A further object of the invention is to provide a more efficient method and apparatus for homogenizing emulsions and dispersions at flow rates of from about 500 gallons per hour up to the order of 14,000 gallons per hour.

DISCLOSURE OF THE INVENTION

It has been determined that there is an optimum gap which should be maintained in a knife edge type homogenizing valve. That gap is very small and heretofore has only been considered for very low flow rates; with the present homogenization method, that very small gap is used for even greater flow rates. To provide for increased flow rate at a given homogenizing pressure, the length or number of the valve slits is increased. For example, by stacking many narrow-slit valves in parallel fluid circuits the degree of homogenization can be increased for a given pressure and flow rate because each valve slit has a critical, optimum gap. Similarly, several optimal valve slits can provide the same degree of homogenization with less homogenizing pressure.

A knife edge valve seat, providing a restricted passageway of a land or travel distance less than about 0.060 inches, is spaced less than about 0.003 inches from a valve plate. Preferably, the gap is about 0.001 inch.

In accordance with a preferred form of the invention, the valve seat is annular and thus forms an annular restricted passageway with the valve plate. To provide for an increased flow rate at a given pressure, several valve members, each serving as the valve seat for one slit and a valve plate for another slit, are stacked. The valve members also separate inner and outer chambers, one of which holds a supply of pressurized fluid and the other of which is at a lower pressure. The fluid is expressed radially through parallel passageways, the gap of each passageway being optimally dimensioned.

PREFERRED EMBODIMENTS OF THE INVENTION

Figure 1:
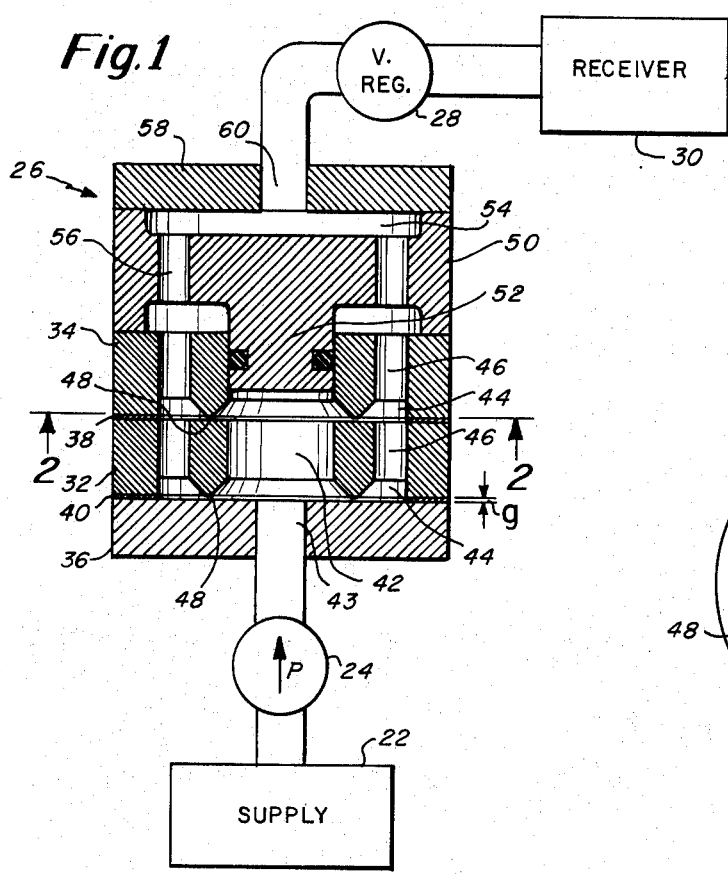
FIG. 1 is an elevational section of a homogenizing valve embodying this invention and having two annular valve slits.
Figure 2:
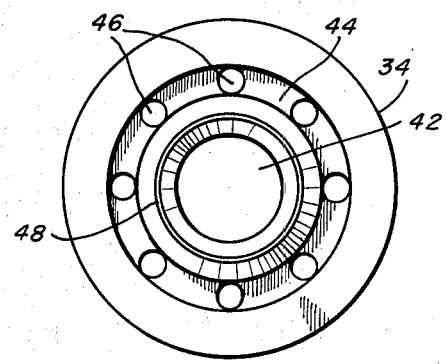
FIG. 2 is a cross sectional view of the homogenizing valve of FIG. 1 taken along line 2—2.

As with many conventional homogenizing systems, an emulsion or dispersion which is to be homogenized is pumped at a high pressure from a supply 22 by a pump 24 (FIG. 1). The high pressure fluid is delivered to a primary valve 26. The homogenized liquid from the valve 26 is then passed through a back pressure regulating valve 28 to a liquid receiver 30. The valve 28 establishes the back pressure within the valve 26 and may simply be a flow restriction of any sort. The preferred back pressure is between 5% and 20% of the pressure at the inlet to valve 26. A back pressure of about 10% has been found particularly suitable.

The valve 26 is not conventional. In this case, it includes two valve members 32 and 34. The valve members 32 and 34 are spaced from each other and from a support plate 36 by precision annular shims 38 and 40. Each valve member 34, 32 has a central hole 42 therethrough. These holes jointly define an inner high pressure chamber in communication with an inlet port 43 in the support plate 36. A groove 44 is formed on the lower surface of each valve member concentric with the central hole 42. The grooves 44 are in fluid communication with each other through axial ports 46, and together with grooves and ports define a low pressure chamber.

The walls between the central holes 42 and the grooves 44 are chamfered to provide knife edges 48. Each knife edge 48 forms a valve seat spaced a small distance above an opposing valve surface. The support plate 36 provides the valve surface below the valve seat on member 32, and the upper surface of member 32 serves as the opposing valve surface for the valve seat of member 34. In the case shown, the shims 38 and 40 provide a predetermined, precise spacing between each knife edge and valve plate. Alternatively, each knife edge could be formed slightly higher than the outer rim of the valve member to provide the desired spacing.

The upper valve member 34 is capped by a valve retainer 50. A central plug 52 on the retainer 50 closes the central hole 42 of the upper valve member 34. A recess 54 in the retainer 50 forms an upper low pressure manifold, and axial ports 56 in the retainer provide fluid communication between that manifold and the low pressure chamber in the valve members 32 and 34. The valve assembly is closed by a cap 58 which provides an outlet port 60.

Although the system is here described as having high pressure emulsion applied to the port 43 and homogenized liquid taken from port 60, the ports may be reversed such that the holes 42 serve as the low pressure chamber and the outer grooves 44 serve as the high pressure chamber. This could be accomplished, for example, by simply inverting the valve assembly 26 in the system shown.

Figure 3:
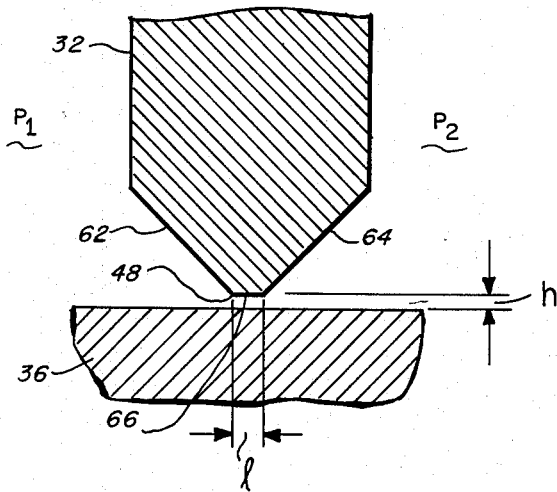
FIG. 3 illustrates a portion of the knife edge valve slit greatly enlarged.

A portion of the knife edge 48 on valve member 32 is shown greatly enlarged in FIG. 3. The knife edge is formed by two chamfered surfaces 62 and 64 formed at about 45° from the valve plate 36. A land surface 66 extends between the chamfered surfaces parallel or near parallel to the valve plate 36. This land surface, along with the opposing surface of plate 36, defines a restricted passageway through which the emulsion is expressed. The length l of that land surface between the high and low pressure chambers is the primary feature that distinguishes a knife edge valve seat. It is across that length l that the fluid at high pressure P1 and near zero velocity undergoes extreme acceleration and pressure reduction to the low back pressure P2. Experiments have shown that to make significant use of this invention, that is to provide a high degree of homogenization at a lower value of P1, the length l of the land surface should be no greater than about 0.060 inches.

Figure 4:
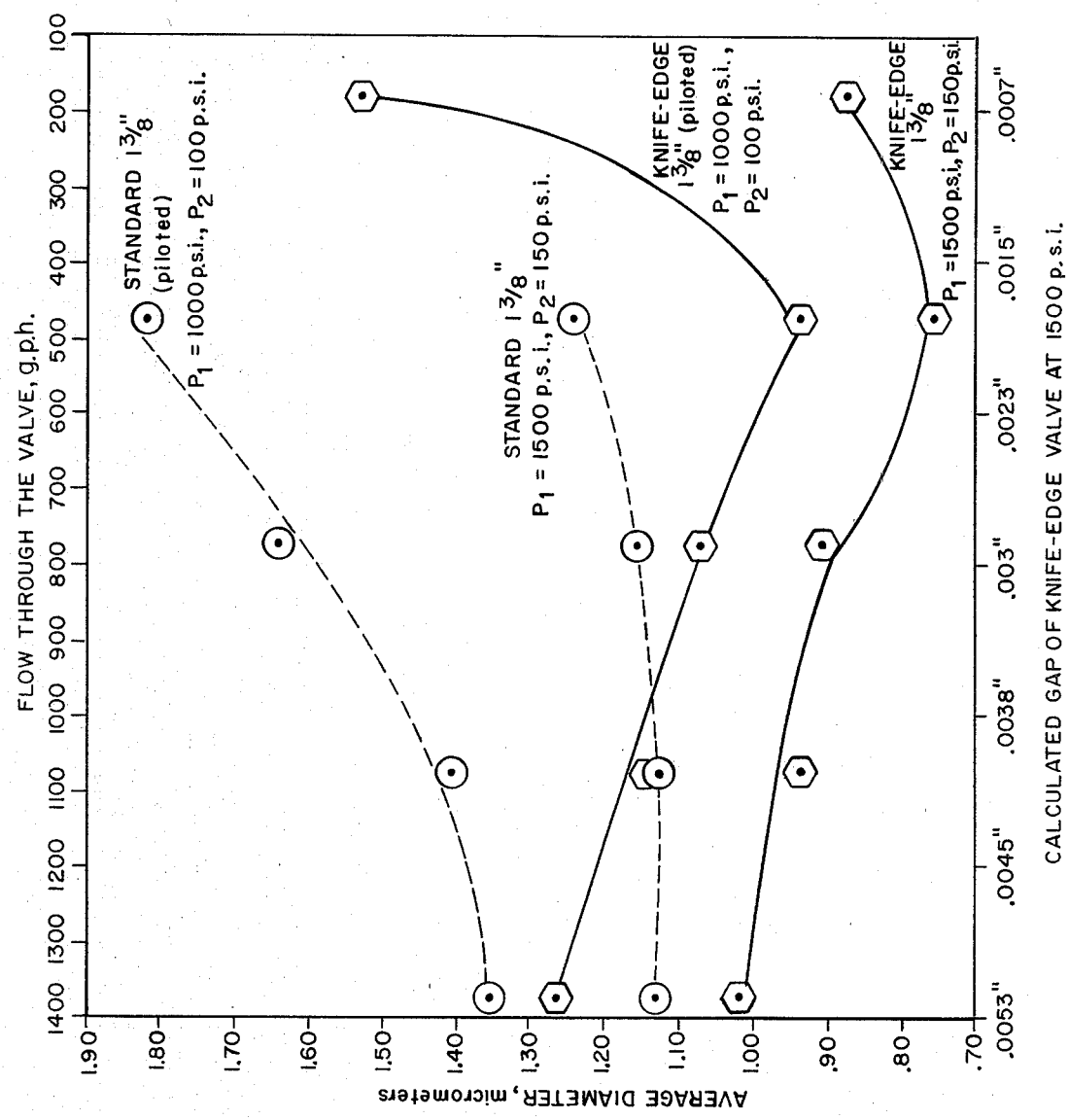
FIG. 4 is a plot of the average diameter of globules in a homogenized product against flow rate and calculated valve gap graphically illustrating the criticality of the gap of the knife edge valve.

A primary aspect of this invention is that the gap, or height, between the land surface 66 and the surface of plate 36 is critical. Experiments have shown that the gap h should not be increased to allow for increased emulsion flow; rather, the gap should be held to less than 0.003 inches. More specifically, a gap of 0.001 inches has been found to be near optimum. Initial test results are shown in FIG. 4 for a valve having a single annular slit. The valve was spring actuated; that is, the two valve members were pressed toward each other by a spring. Liquid was supplied to the valve by a constant flow pump and flow through the valve was controlled by bypassing some liquid. By adjusting the spring force, the space between the valve members, and thus the pressure, was controlled. The average diameter of the globules in the emulsion product were then plotted against flow rate. From the flow rate, fluid pressures and valve geometry the gap could then be calculated. The calculated gap is shown for the valve operating at 1500 psi inlet pressure. FIG. 4 shows that the degree of homogenization increases, or the globule size decreases, as the gap of a knife edge valve decreases. A strong contrast can be seen in the decrease in homogenization with a conventional flat valve as the gap height h is decreased. The emulsion used in the test was filled milk of 3.5% corn oil, 8% non-fat milk solids and 88.5% water. The average emulsion droplet diameter was determined using a recognized spectroturbidimetric technique.

Figure 5:
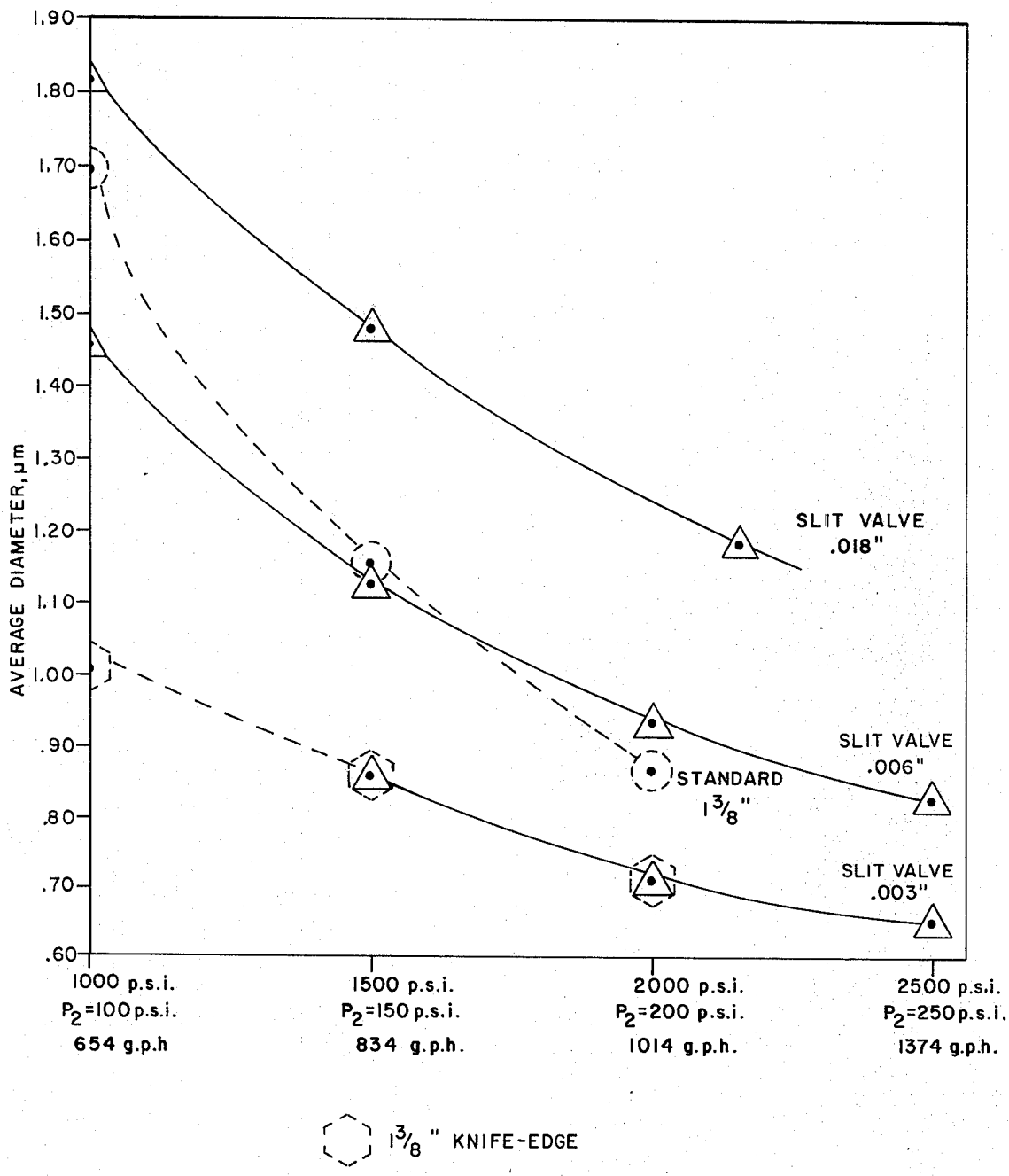
FIG. 5 is a graph of average globule diameter against pressure for three valves, such as shown in FIG. 11, having different gaps.
Figure 6:
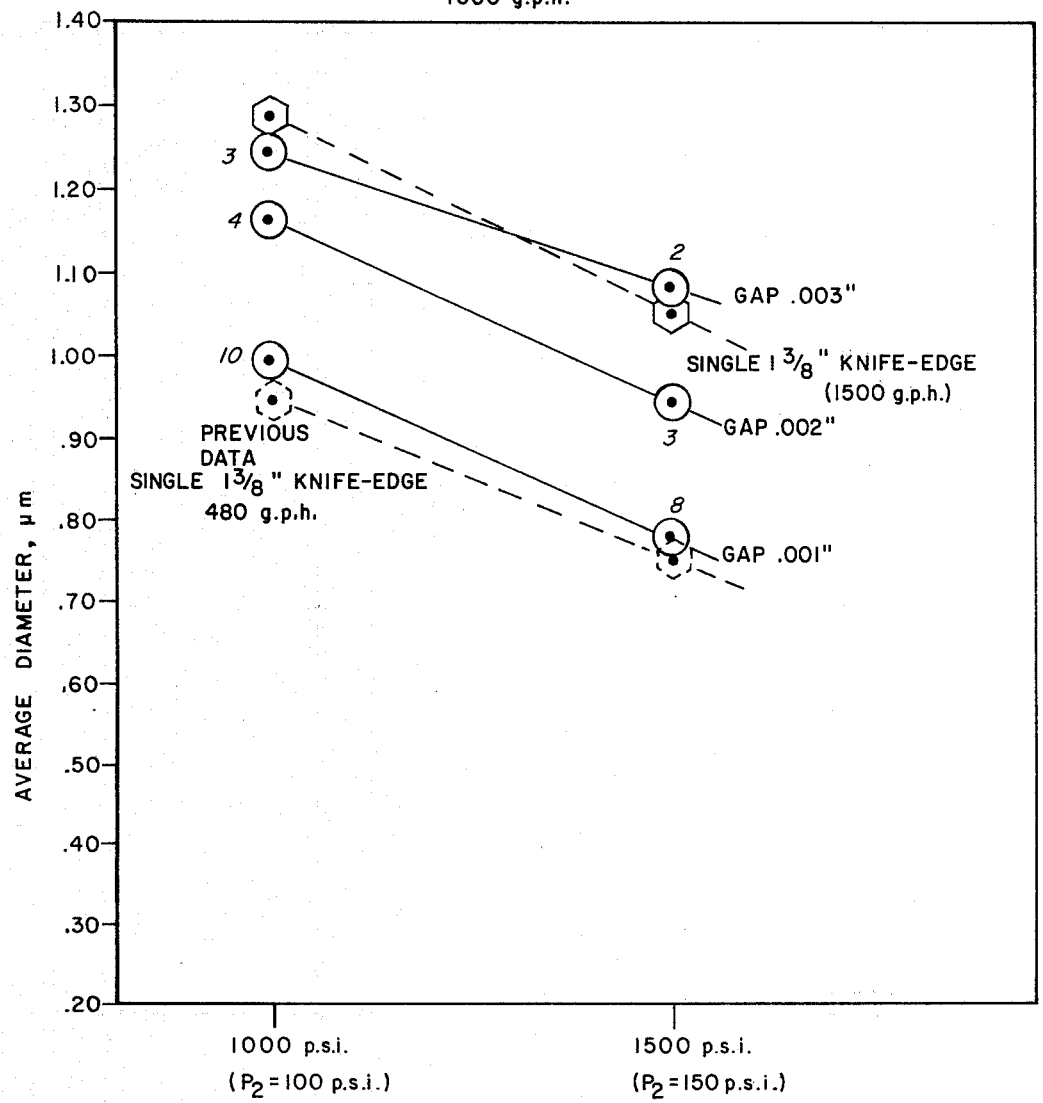
FIG. 6 is a graph of average globule diameter against pressure for stacked valve assemblies as shown in FIG. 7; the graph indicates increasing homogenization with decreasing gap for a given homogenizing pressure and flow rate.

Similar results can be seen in FIGS. 5 and 6. In FIG. 5 the average globule diameter is plotted against pressure for three linear slit valves (FIG. 11) similar to those described in U.S. Pat. No. 4,081,863 to Rees. To provide equal flow rates, the slit cross sectional areas of the three valves were equal: one valve had a gap of 0.018 inch and a length of 0.75 inches; a second valve had a gap of 0.006 inch and a length of 2.25 inches; and a third valve had a gap of 0.003 inch and a length of 4.50 inches. It can be seen from the data in FIG. 5 that as the gap becomes smaller the homogenizing efficiency increases. Results from a standard annular valve and from a knife edge annular valve are indicated in broken lines on this graph for comparison. It is significant that the 0.003 inch knife edge annular valve data points correspond to the 0.003 inch knife edge linear slit valve data points. This indicates that the efficiency of the small gap, knife edge valve is not dependent on the shape of the valve slit.

FIG. 6 indicates the improved homogenizing efficiency which may be achieved at a given flow rate by reducing the gap of a knife edge annular slit valve. To maintain a nominal 1500 gallon per hour flow rate at both 1000 psi and 1500 psi homogenizing pressures and at gaps of 0.003 inch, 0.002 inch and 0.001 inch, additional valve members were stacked to provide from two to ten parallel annular slits. The specific number of valve slits provided in each assembly for which the data was plotted is shown adjacent each data point. FIG. 6 shows that for a given homogenizing pressure and a given flow rate, the homogenizing efficiency can be increased by reducing the gap and increasing the total slit length of the valve assembly. FIG. 6 also indicates that the high homogenizing efficiency attained at 480 gallons per hour with a single annular knife edge valve (FIG. 4) can be obtained for about three times that flow rate using a multislit valve. However, as the gap is widened to about 0.003 inch the results obtained are comparable to those obtained with a single slit knife edge valve of wider gap. Thus, to make full use of this invention it is important that the gap be held to less than 0.003 inch.

When the total slit length is controlled by the number of valve rings, it is varied by discrete amounts. Thus, the 1500 gallons per hour is only a nominal flow rate, and the actual flow through the assembly varies from 1250 gallons per hour to 1670 gallons per hour.

Figure 7:
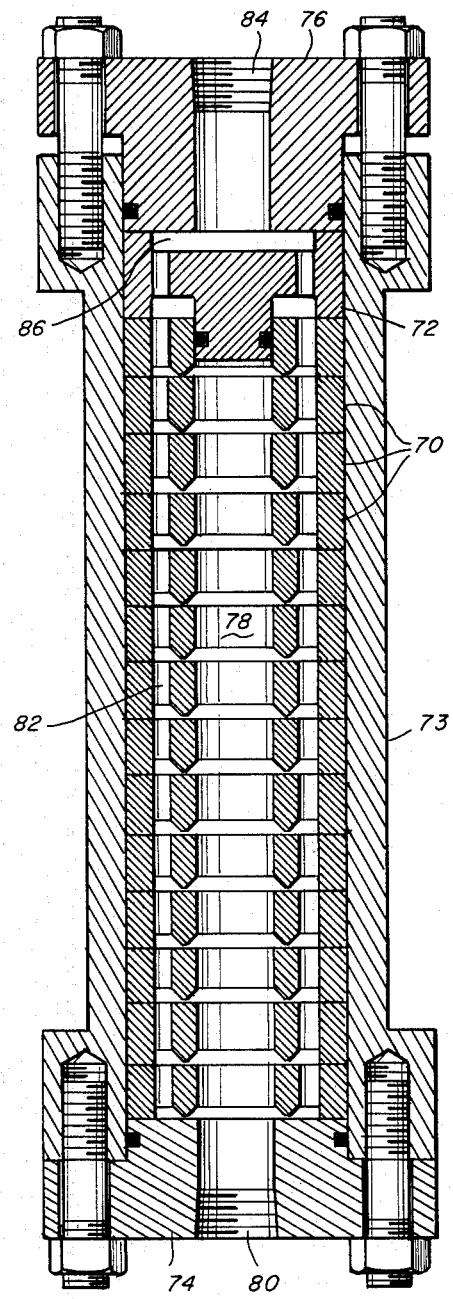
FIG. 7 is a more detailed elevational view of a preferred embodiment of the invention.

A valve assembly suitable for high flow rate homogenizing systems and used to obtain the data of FIG. 6 is shown in FIG. 7. This valve assembly includes 14 valve members 70 stacked in the same manner that valve members 32 and 34 are stacked in the embodiment of FIG. 1. A valve retainer 72 is provided as before. The valve members 70 and retainer 72 are surrounded by a cylindrical outer casing 73 to which end plates 74 and 76 are bolted. As before, a central bore 78 is defined by the many valve members. The bore 78 is in fluid communication with an inlet/outlet port 80. An outer chamber 82 defined by the many peripheral ports in the valve members is in fluid communication with an inlet/outlet port 84. By providing a plurality of knife edge valve seats, each gap can be held to less than 0.003 inches while still providing for a high flow rate at a given homogenizing pressure and back pressure.

Figure 8:
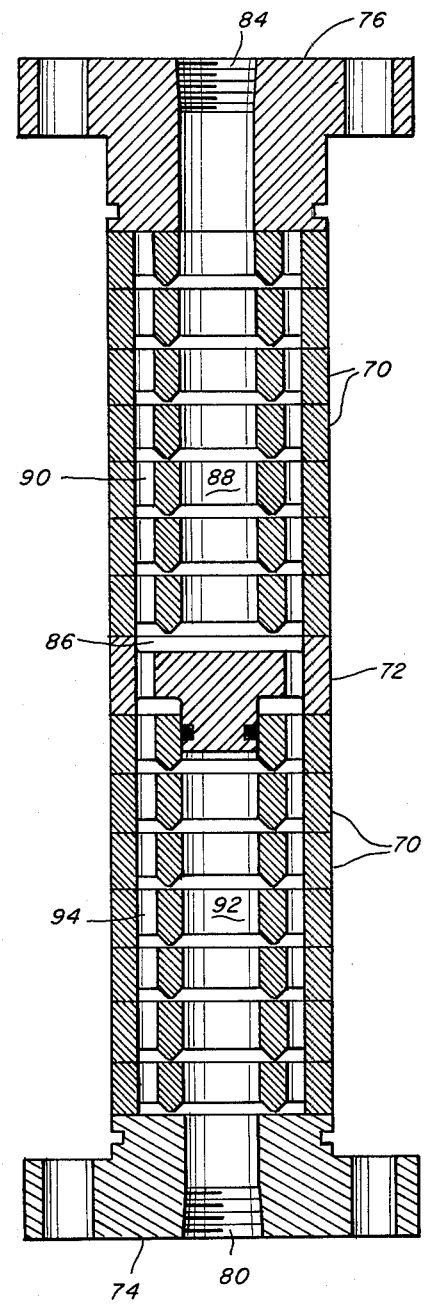
FIG. 8 is an elevational sectional view of just the valve members of the embodiment of FIG. 7 but with a slit bypassing member repositioned to provide a reduced number of functional homogenizing slits.

FIG. 8 indicates the manner in which the valve assembly of FIG. 7 can be customized to provide for reduced flow rates at a given homogenizing pressure or to allow for the use of higher homogenizing pressures without increasing the flow rate. Within the casing 73, the retainer 72 and a number of the valve members 70 are rearranged such that the retainer 72 provides a bypass around the valve members above it. The manifold 86 in the retainer 72 equalizes the fluid pressure between the central bore 88 of the upper valve members and the peripheral ports 90 of those valve members. The pressure differential is maintained, however, between the central bore 92 of the lower valve members and the peripheral ports 94. Thus, the total cross sectional area of the homogenizing valve slits is reduced. If the homogenizing pressure of the emulsion is held at the same pressure as with a full stack of valve members, the flow rate is reduced. Similarly, the flow rate can be held to the same level as with the arrangement of FIG. 7 if the homogenizing pressure is increased accordingly.

This embodiment illustrates an important feature of the present invention. In past homogenizing systems the flow rate for a valve having a given circumference was determined by the pressure and the gap between the valve seat and the plate. In accordance with the present invention that gap is held to a critical optimum for all flow rates of the assembly. Flow rate is determined solely by the pressure and the total cross sectional area of the valve slits rather than by the valve gap.

For a gap of 0.001 inches, a homogenizing pressure of 2000 psi and a back pressure of 200 psi the following flow rates can be obtained by providing the total slit lengths indicated:

500 gph—6.9 in.
1,500 gph—20.7 in.
3,500 gph—48.3 in.
6,000 gph—82.8 in.
7,500 gph—103.5 in.
10,000 gph—138.0 in.
14,000 gph—193.2 in.

Figure 9:
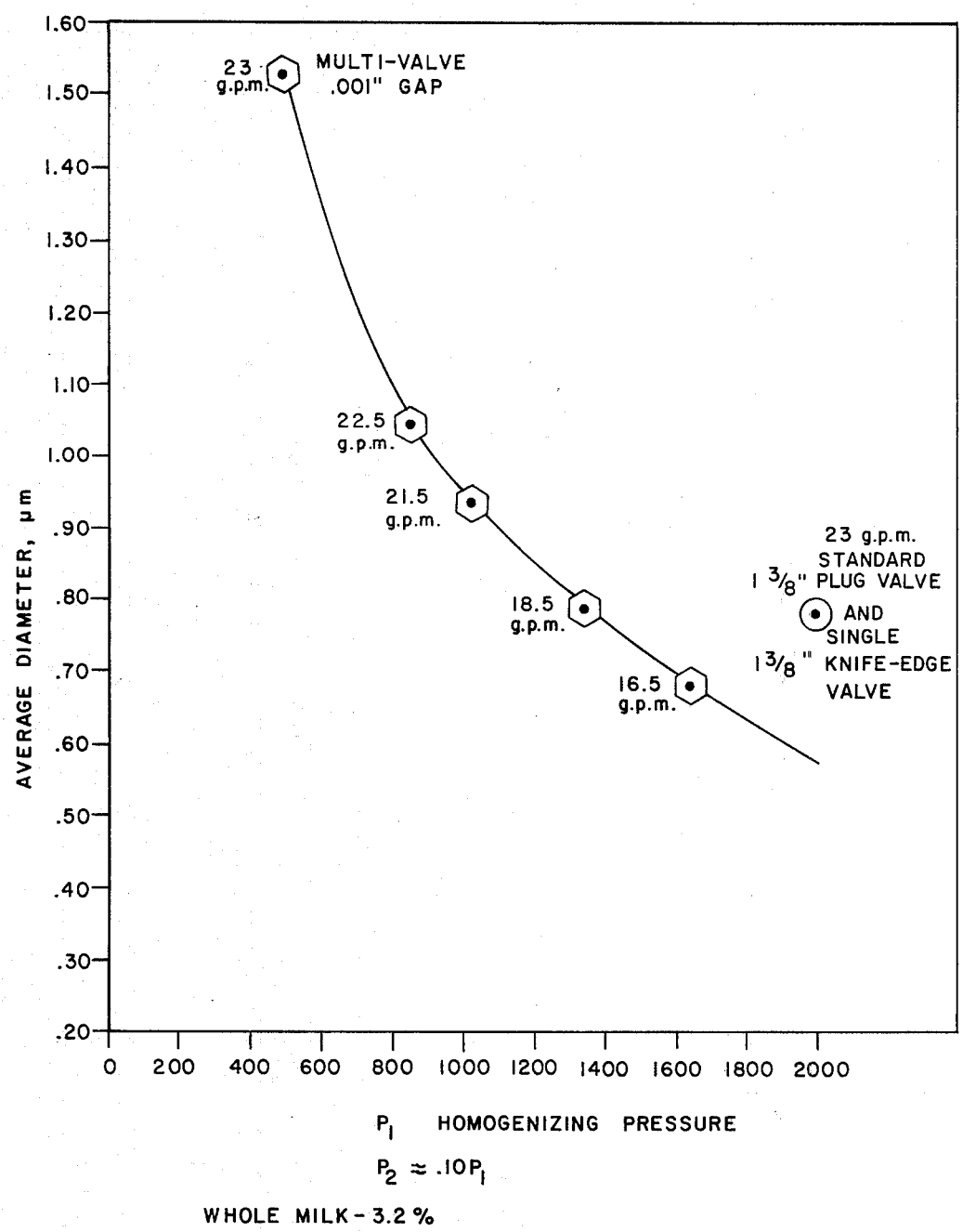
FIG. 9 is a plot of the average diameter of globules in a homogenized product against homogenizing pressure for the embodiment of FIG. 7 and for a normal operating condition of a conventional valve.

The graph of FIG. 9 shows the results of a test of the homogenizing valve of FIGS. 7 and 8. A single run of a conventional valve is also shown for comparison. In both cases the homogenizer pumped at a rate of 23 gpm, but some of the flow was bypassed when the knife edge valve was tested. It can be seen that the same degree of homogenization can be obtained at a much lower pressure using the valve of this invention. The power requirement for homogenizing a unit of emulsion is proportional to the product of flow rate and homogenizing pressure. Thus the power ratio of the novel and conventional valves at an average homogenized diameter of 0.8 micrometer is:

$$(23 \times 1350)/(23 \times 2000) = 0.675$$

Thus, the power requirement is reduced by almost one third using the valve of this invention.

Figure 10:
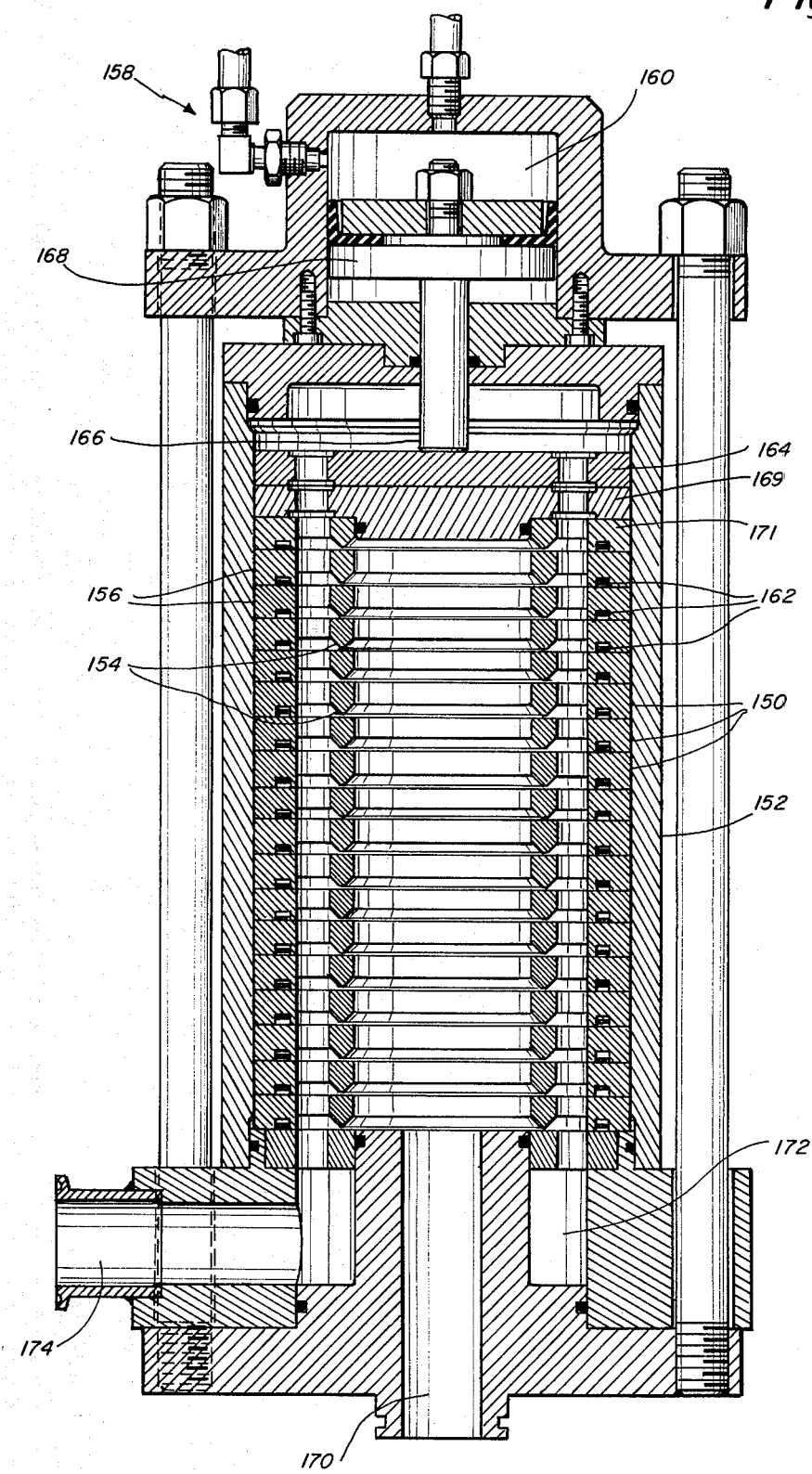
FIG. 10 is an elevational sectional view of a production model of the invention having a hydraulic valve actuator.

A modification of the stacked ring valve is shown in FIG. 10. As before, this embodiment includes a plurality of valve members 150 stacked within a cylindrical casing 152. In this case, the valve seats 154 are machined so that each is slightly higher than the outer rim 156 of each valve member. This provides the optimum valve gap without the use of shims.

The embodiment of FIG. 10 also includes a hydraulic valve actuator (HVA) 158 which allows for widening of the valve slits to purge any sediments which may have collected in the slits. To that end, high pressure hydraulic fluid presses downwardly against a piston 168 to force a piston rod 166 against a pressure distributing plate 164. The plate 164 is thereby forced downwardly against the stack of rings to compress wave springs 162 positioned between the valve members. With the valve members thus pressed closely against each other the optimum spacing is provided between the valve seats and the opposing valve surfaces. If, on the other hand, the pressure in chamber 160 is reduced, the springs 162 are able to spread the valve members apart to increase the valve gaps.

The HVA 158 is positioned above the stack of valve members 150, and both the inlet and outlet ports are provided at the lower end of the assembly. High pressure fluid is directed to the center chamber within the stack of valve members by an inlet port 170. The fluid is then expressed radially out through the valve slits into the peripheral low pressure chamber provided by the valve members. The low pressure homogenized fluid is then directed downward to an annulus 172 and outward through the outlet port 174.

Where the use of a valve actuator such as shown in FIG. 10 is desirable, it is important that the diameter of the valve members not be so large as to make the valve actuator too cumbersome. The upward force against the valve actuator is equal to the wave spring force plus the product of the fluid pressure within the central high pressure chamber and the projected area of the retainer 169 and top valve ring 171 exposed to that high pressure. Similarly, the downward compressive force against the stack of valve members is equal to the product of the hydraulic pressure in chamber 160 and the top surface area of piston 168. If only a few large diameter valve members were utilized, a large diameter HVA would be required to overcome the upward force at a reasonable hydraulic pressure. However, by stacking a large number of valve members to obtain the desired flow rate, the diameter of retainer 169 and thus the size of the HVA can be minimized.

Figure 11:
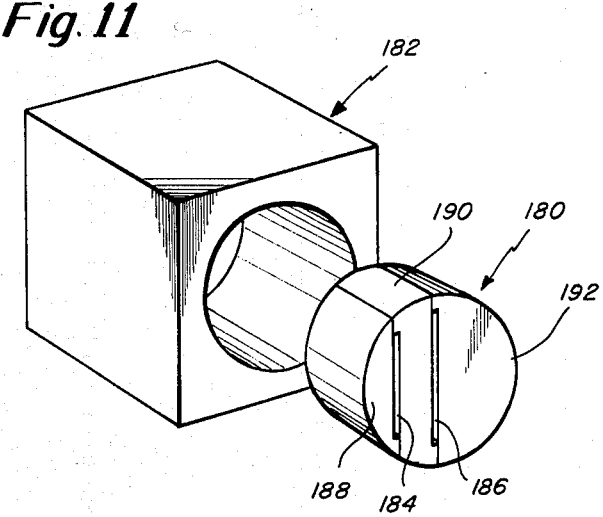
FIG. 11 is a perspective, exploded view of an alternative embodiment of the invention in which linear valve slits are provided.

A slit valve such as taught in U.S. Pat. No. 4,081,863 but modified in accordance with this invention is shown in FIG. 11. In this embodiment high pressure fluid is directed through a slit assembly 180 positioned within a fluid conduit 182. Two linear valve slits 184 and 186 are formed between segments 188, 190 and 192 of the valve assembly 180. As before, these slits are formed with a knife edge configuration and the gap of each slit is less than 0.003 inches.

Figure 12:
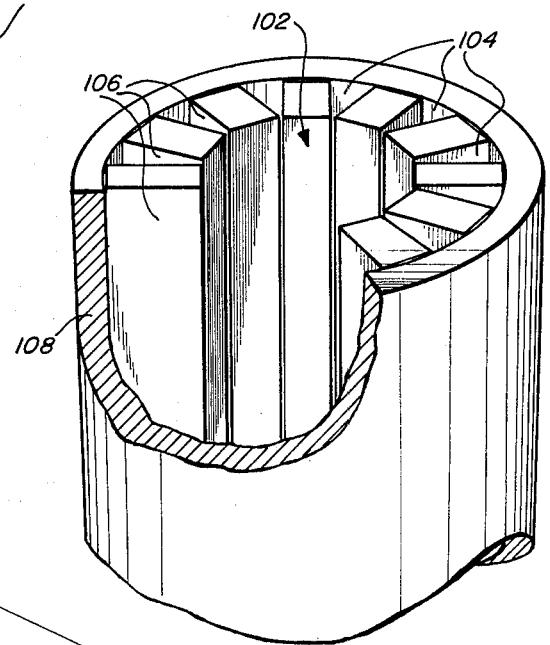
FIG. 12 is a perspective view, broken away, of yet another embodiment of the invention in which the valve slits are formed of blocks within a cylinder.

In the embodiment of FIG. 12, a central passage 102 and peripheral passages 104 in a valve assembly are formed by a number of axially extending bars 106 spaced around the inner surface of a cylindrical casing 108. A slight space is provided between the adjacent edges of the bars to provide the valve slits. In accordance with this invention, the gap of each of those valve slits is less than about 0.003 inches and is preferably 0.001 inches.

Figure 13:
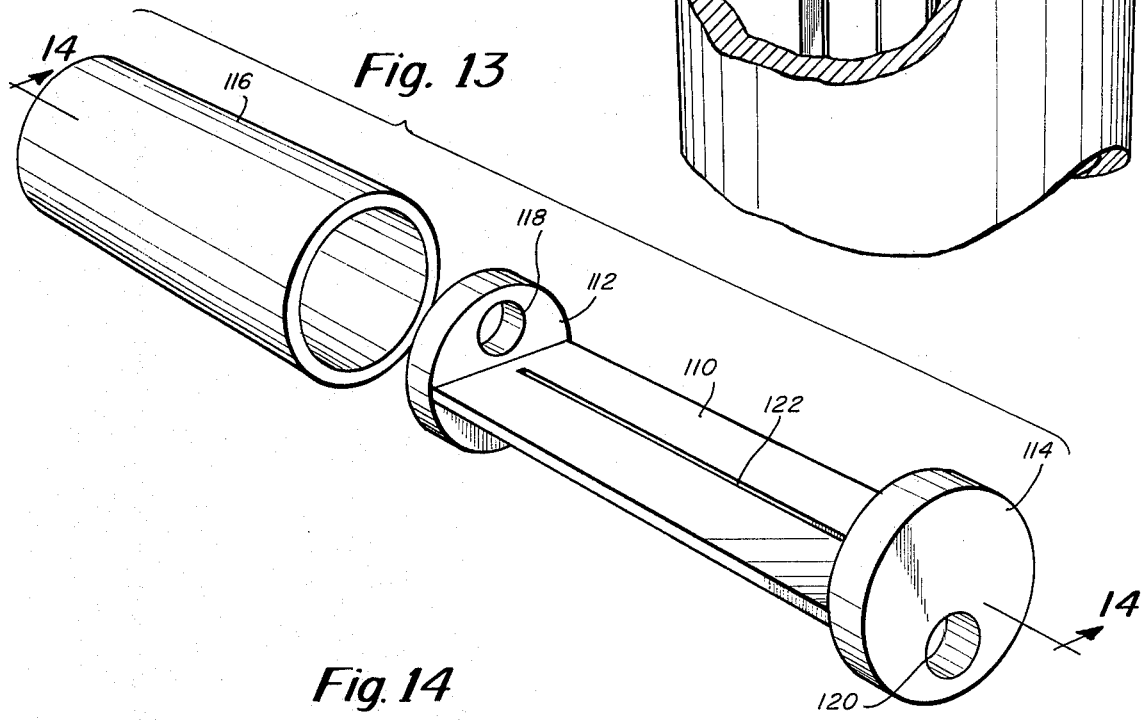
FIG. 13 is an exploded view of yet another embodiment of the invention having a single axial slit.
Figure 14:
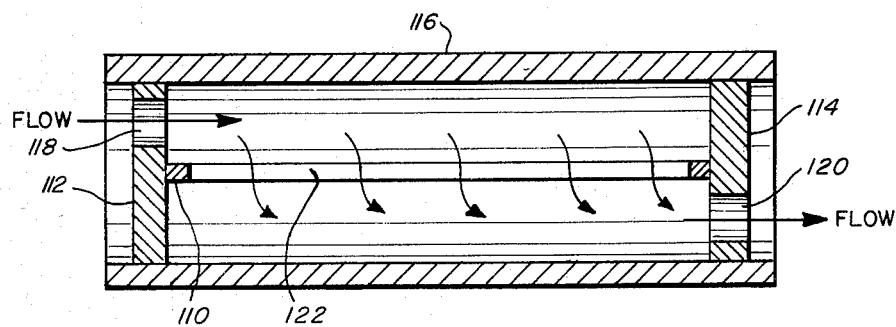
FIG. 14 is a longitudinal sectional view of the embodiment of FIG. 13.

Yet another embodiment of the invention is shown in FIGS. 13 and 14. In that embodiment, a plate 110 extends between two discs 112 and 114 positioned within a cylindrical casing 116. To one side of the plate 110, a high pressure chamber is in fluid communication with an emulsion supply through port 118 in the disc 112. A low pressure chamber on the opposite side of the plate is in fluid communication with an outlet port 120 in the disc 114. A slit 122 is formed in the plate 110 and that slit has a gap of less than about 0.003 inches.

Figure 15:
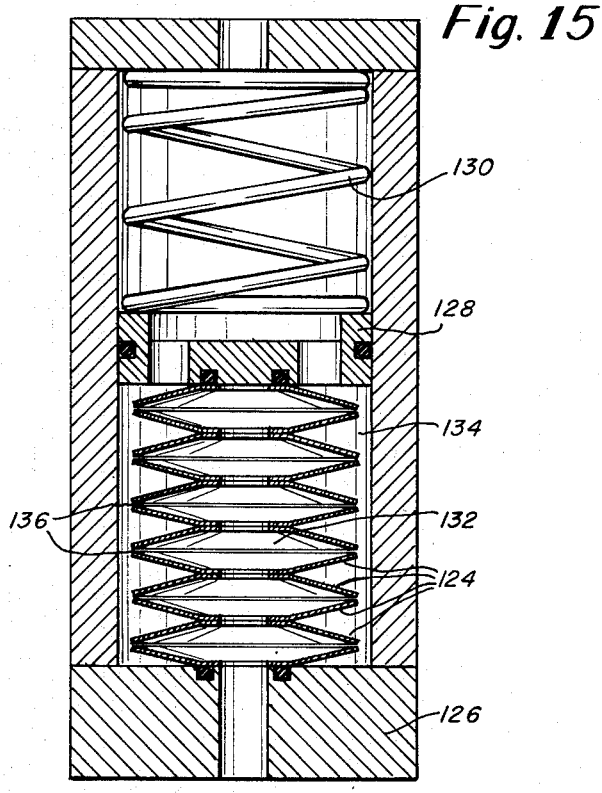
FIG. 15 is an elevational sectional view of another embodiment of the invention in which the valve slits are formed between frustoconical washers.

In the embodiment of FIG. 15, a stack of frustoconical washers 124 is held in compression between an end plate 126 and a retainer 128 by a compression spring 130. The space 132 within the several washers forms the high pressure chamber, and a low pressure chamber 134 surrounds the washers. The washers are sufficiently resilient that under high pressure they spread slightly to provide the necessary gaps along the interfacing edges 136. The gap can be decreased by increasing the compression force and can be increased by decreasing that force. As with the embodiment of FIGS. 1–6, the flow rate for a given homogenizing pressure can be determined by the number of washers provided.

Figure 16:
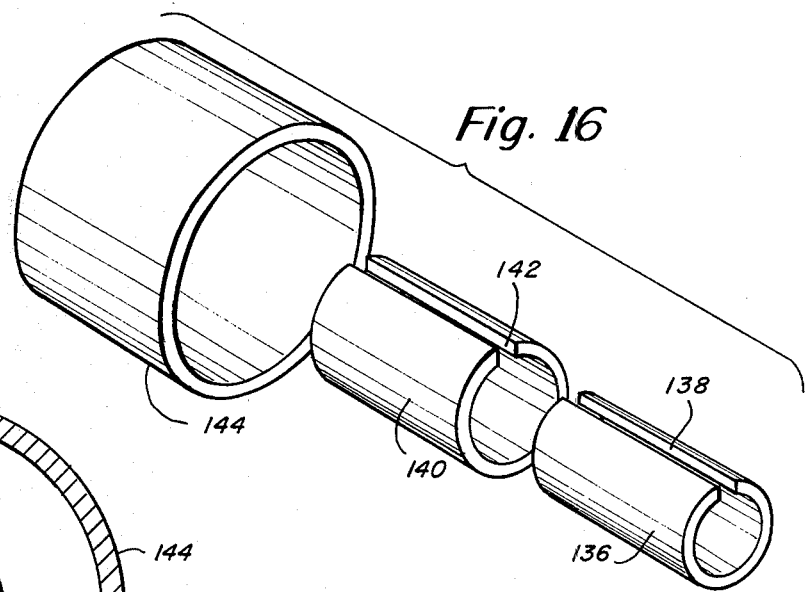
FIG. 16 is an exploded view of a still further embodiment of the invention in which a linear slit is formed by two large slits in interfitting tubes.
Figure 17:
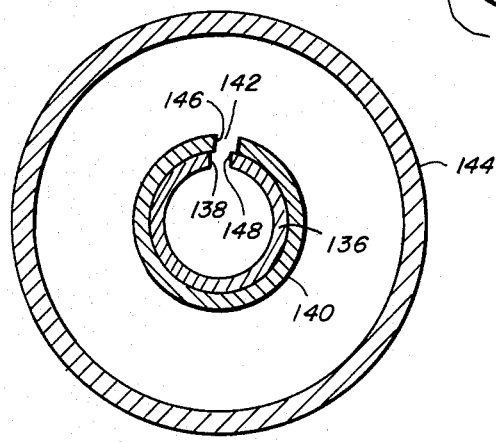
FIG. 17 is a cross sectional view of the embodiment of FIG. 16.

A final embodiment of the invention is shown in FIGS. 16 and 17. This valve assembly comprises a central sleeve 136 having a wide longitudinal slit 138 therein. This sleeve is positioned in a larger sleeve 140 which also has a wide slit 142. Both sleeves are positioned within an outer casing 144. By rotating the sleeve 136 within sleeve 140, the gap between edge 146 of slit 142 and edge 148 of slit 138 can be set to the optimum amount.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A method of cleaning a plurality of valve slits between stacked valve members in a fluid mixing or homogenizing valve assembly, at least some of the valve members having valve seats protruding axially therefrom and being spaced from adjacent valve members by rigid spacing means positioned between the valve members, the method comprising:

providing spring elements between the valve members for exerting axial spring forces on the valve members to separate the valve members, the valve members and rigid spacing means being fully compressed into a tight stack and the spring elements being compressed between the valve members by means of a valve actuating means during homogenizing operation of the valve with a valve slit gap between each valve seat and adjacent valve member being determined by said rigid spacing means independent of the spring elements with the valve members and rigid spacing means fully compressed; and releasing the valve members such that they are separated by the spring elements to allow for substantially larger slit gaps for cleaning of the slits.

2. A method of cleaning a plurality of valve slits between stacked valve members as claimed in claim 1 wherein the valve seats are annular knife edge valve seats and said rigid spacing means provide for a spacing of the knife edge valve seats from adjacent valve members of less than about 0.003 inches.

* * * * *